(12) United States Patent
Krebs

(10) Patent No.: US 11,295,428 B2
(45) Date of Patent: Apr. 5, 2022

(54) DEVICE FOR INSPECTING PRINTED IMAGES

(71) Applicant: elexis AG, Wenden (DE)

(72) Inventor: Stephan Krebs, Landsberg am Lech (DE)

(73) Assignee: ELEXIS AG, Wenden (DE)

( * ) Notice: Subject to any disclaimer, the term of this patent is extended or adjusted under 35 U.S.C. 154(b) by 203 days.

(21) Appl. No.: 16/069,821

(22) PCT Filed: Dec. 30, 2016

(86) PCT No.: PCT/EP2016/082915
§ 371 (c)(1),
(2) Date: Dec. 24, 2018

(87) PCT Pub. No.: WO2017/121627
PCT Pub. Date: Jul. 20, 2017

(65) Prior Publication Data
US 2019/0122352 A1    Apr. 25, 2019

(30) Foreign Application Priority Data

Jan. 12, 2016 (DE) .................... 102016100437.5

(51) Int. Cl.
*G06K 9/00* (2006.01)
*G06T 7/00* (2017.01)
*B41F 33/00* (2006.01)
*G01N 21/88* (2006.01)
*G01N 21/89* (2006.01)
(Continued)

(52) U.S. Cl.
CPC ........ *G06T 7/0002* (2013.01); *B41F 33/0036* (2013.01); *G01N 21/8806* (2013.01); *G01N 21/8901* (2013.01); *G01N 21/894* (2013.01);
*G01N 21/896* (2013.01); *G01N 2021/8835* (2013.01); *G01N 2021/8908* (2013.01);
(Continued)

(58) Field of Classification Search
CPC .................................................. G06T 7/0002
USPC ...................................................... 382/112
See application file for complete search history.

(56) References Cited

U.S. PATENT DOCUMENTS 7,784,975 B2   8/2010   Krebs et al.
7,969,565 B2   6/2011   Stöber
(Continued)

FOREIGN PATENT DOCUMENTS

CN   104067110 A   9/2014
CN   104246483 A   12/2014
(Continued)

*Primary Examiner* — Stephen P Coleman
(74) *Attorney, Agent, or Firm* — Slater Matsil, LLP

(57) ABSTRACT

An apparatus for inspecting images is disclosed. In an embodiment an apparatus includes a camera for recording a surface of a printed product, the printed product being movable relative to the apparatus, a first illumination unit of a first type for illuminating a first partial region of a region that is capturable by the camera, a second illumination unit of a second type for illuminating a second partial region of the region that is capturable by the camera, and an evaluation unit for processing image information captured by the camera, wherein the first illumination unit differs from the second illumination unit, and wherein the first illumination unit forms a diffuse illumination source and has an internally illuminated tunnel.

20 Claims, 2 Drawing Sheets

(51) Int. Cl.
*G01N 21/894* (2006.01)
*G01N 21/896* (2006.01)

(52) U.S. Cl.
CPC ............... *G06T 2207/10152* (2013.01); *G06T 2207/30168* (2013.01)

(56) References Cited

U.S. PATENT DOCUMENTS

| | | | |
|---|---|---|---|
| 9,719,939 B2 | 8/2017 | Krebs | |
| 2008/0316596 A1* | 12/2008 | Cha | G02B 30/27 |
| | | | 359/463 |
| 2010/0134695 A1* | 6/2010 | O'Connell | H04N 5/222 |
| | | | 348/722 |
| 2013/0208987 A1* | 8/2013 | Nehse | G06K 9/4604 |
| | | | 382/199 |
| 2014/0002633 A1* | 1/2014 | Okuda | H04N 7/183 |
| | | | 348/87 |
| 2014/0368634 A1 | 12/2014 | Pichon et al. | |
| 2015/0077538 A1* | 3/2015 | Krebs | G06T 7/0008 |
| | | | 348/88 |
| 2015/0205261 A1* | 7/2015 | Kawauchi | G03H 1/2286 |
| | | | 359/3 |
| 2016/0073041 A1* | 3/2016 | Daalderop | H04N 5/2256 |
| | | | 348/370 |

FOREIGN PATENT DOCUMENTS

| | | | | |
|---|---|---|---|---|
| DE | 10204939 | A1 | 9/2003 | |
| DE | 102005031957 | A | 1/2007 | |
| DE | 102007007828 | A1 | 8/2008 | |
| DE | 102007025910 | A1 | 12/2008 | |
| DE | 102007059842 | A1 | 6/2009 | |
| DE | 102011113670 | A | 3/2013 | |
| DE | 102012101310 | B3 | 4/2013 | |
| DE | 202015104751 | * | 9/2015 | ............. B41F 33/00 |
| DE | 202015104751 | U1 | 9/2015 | |
| EP | 2003443 | A1 | 12/2008 | |
| EP | 2011755 | A1 | 1/2009 | |
| WO | 9418643 | A1 | 8/1994 | |

* cited by examiner

DEVICE FOR INSPECTING PRINTED IMAGES

This patent application is a national phase filing under section 371 of PCT/EP2016/082915, filed Dec. 30, 2016, which claims the priority of German patent application 102016100437.5, filed Jan. 12, 2016, each of which is incorporated herein by reference in its entirety.

TECHNICAL FIELD

The invention relates to an apparatus for inspecting printed images, having a camera for recording a surface of a printed product, which is movable relative to the apparatus, and having a first illumination unit of a first type for illuminating a first partial region of the surface that is capturable by the camera, and having an evaluation unit for processing the image information captured by the camera.

BACKGROUND

Such an apparatus for inspecting printed images is known, for example, from DE 10 2012 101 310 B3. It serves for inspecting, for example, labels situated on a carrier, which are moved at high speed through a recording region of the apparatus for inspecting printed images.

SUMMARY OF THE INVENTION

Embodiments provide an apparatus for inspecting printed images, having capabilities for identifying errors in the printed products.

Embodiments provide an apparatus of the type mentioned in the introductory part, which comprises a second illumination unit of a second type, which differs from the first type, for illuminating a second partial region of the surface that is capturable by the camera, wherein the first illumination unit has an internally illuminated tunnel and forms a diffuse illumination source.

It is possible with the apparatus according to embodiments of the invention to identify with a single camera, but two different illumination devices, various errors in printed products. For example, diffuse illumination is highly suited for identifying errors in the printed image in the case of reflective surfaces. Other errors, for example, incorrect positioning of transparent labels, cannot be identified with such apparatuses for inspecting printed images.

The apparatus for inspecting printed images according to embodiments of the invention has two illumination units, which illuminate different regions of the traversing printed products. This means with respect to the image captured by the camera that different regions of the surface that is capturable by a camera are illuminated in different ways. An illumination device of a specific type does not refer to the type of light generation, but to the properties of the light. In particular, different types that should be mentioned are diffuse light, directional incident light, background light, UV light etc. On the other hand, it is irrelevant whether the light originates from a fluorescence light, an LED or an incandescent lamp, that is to say this is not a different type within the meaning of this patent application.

According to embodiments of the invention, a first region of the surface that is capturable by the camera is illuminated with diffuse light, with an internally illuminated tunnel being used herefor. The illumination of a second region is preferably effected by way of background illumination. Since the camera can capture both regions, it is possible using a single camera to perform a surface inspection at the same time as identifying, for example, holes in the printed products by way of background illumination.

For identifying errors, the image information captured by the camera is processed in an evaluation unit. Different regions of the image sensor that correspond to the differently illuminated partial regions of the region that is captured by the camera are evaluated here.

In advantageous implementations, the illumination units are operated cyclically with time synchronization. As a result, both partial regions are illuminated simultaneously, and, upon triggering of the camera, both partial regions are contained in the recorded image information in the illuminated state.

The different types of the illumination units are preferably diffuse illumination, illumination from the rear side of the printed product, or incident light, in particular directional incident light with an adjustable light incidence angle.

The evaluation unit is preferably designed such that a multiplicity of successively recorded first stripes are joined together to form an overall image. The same can be done with a multiplicity of successively recorded second stripes. To this end, the recording frequency is matched to the speed of movement and the width of the recorded stripes such that an image without gaps is obtained.

BRIEF DESCRIPTION OF THE DRAWINGS

The invention will be explained in more detail below on the basis of exemplary embodiments. In the drawing.

DETAILED DESCRIPTION OF ILLUSTRATIVE EMBODIMENTS

Figure 1:
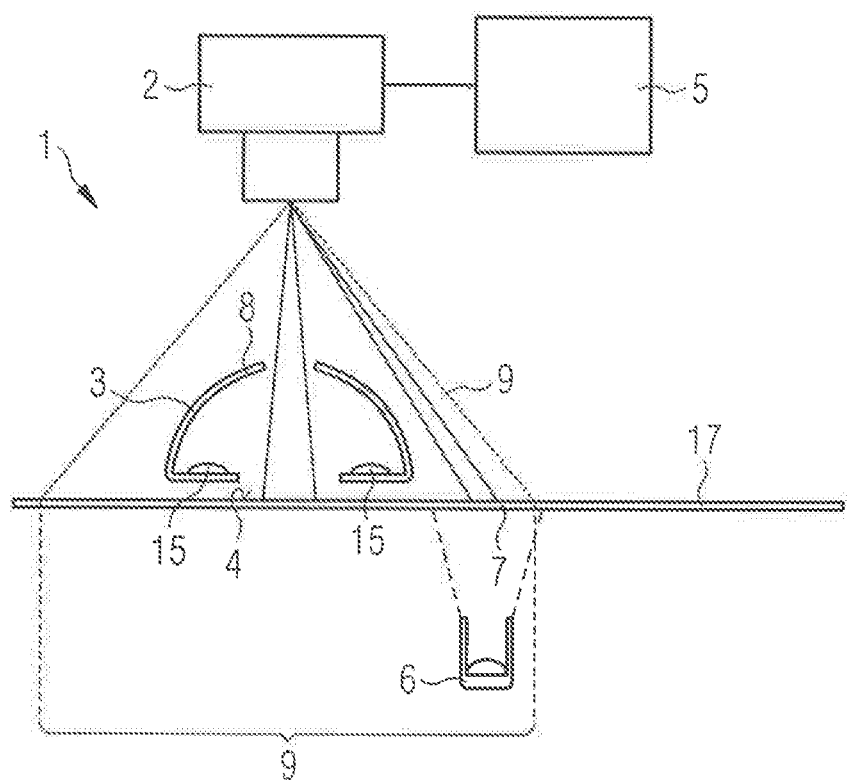
FIG. 1 shows an apparatus for inspecting printed images having two illumination units, a camera and an evaluation device.

FIG. 1 illustrates an apparatus 1 for inspecting printed images. The illustration is schematic and does not reproduce the size ratios of the individual components relative to one another to scale. Components having the same function are denoted with the same reference sign as in the subsequent figures, even though the exact implementations may deviate from one another.

Provided is a camera 2, which is an area scan camera, also known as a matrix camera. In a region 9, which is capturable by the camera, two illumination units 3 and 6 are provided. A first illumination unit 3 produces diffuse light. It is provided for this purpose with a tunnel 8, which is illuminated from inside using, for example, LED rows 15. The material of the tunnel wall is composed of a diffusely reflective material, or is coated with a diffusely reflective material, such that the light produced by the LED rows 15 is uniformly distributed and allows, in the illuminated region 4 of the printed product 17, illumination in which light is incident on the printed product 17 from many directions. Using such an illumination device, it is also possible to check highly reflective materials or holograms for printing errors. The camera 2 "sees" through a slit in the top side of the tunnel 8 onto the illuminated region 4 and can here record an image of the printed product 17.

Likewise provided in the region 9, which is capturable by the camera 2, is a second illumination unit 6, which illuminates the printed product 17 from the rear side, i.e., on the side that faces away from the camera 2. By illuminating from the rear side it is possible, for example, to detect small holes in the printed product 17, which are identifiable in a recorded image as bright points.

In the apparatus for inspecting printed images according to embodiments of the invention, both illumination units 3 and 6 are arranged within the region 9, which is capturable by the camera 2. The first illumination unit 3 has a first type, i.e., a first kind of lighting. In the exemplary embodiment described with reference to FIG. 1, this is diffuse illumination. The second illumination unit 6 has a second type of illumination, in this case background illumination. Due to the two different types of illumination, different kinds of printing errors can be ascertained.

One special feature of the apparatus according to embodiments of the invention is that these various errors can be detected without the need for a plurality of cameras. The simultaneous evaluation of different "error images" becomes possible due to the combination of two illumination units of a different type with one camera which can capture the two differently illuminated partial regions 4 and 7 at the same time. This will be explained in more detail on the basis of FIG. 2.

Figure 2:
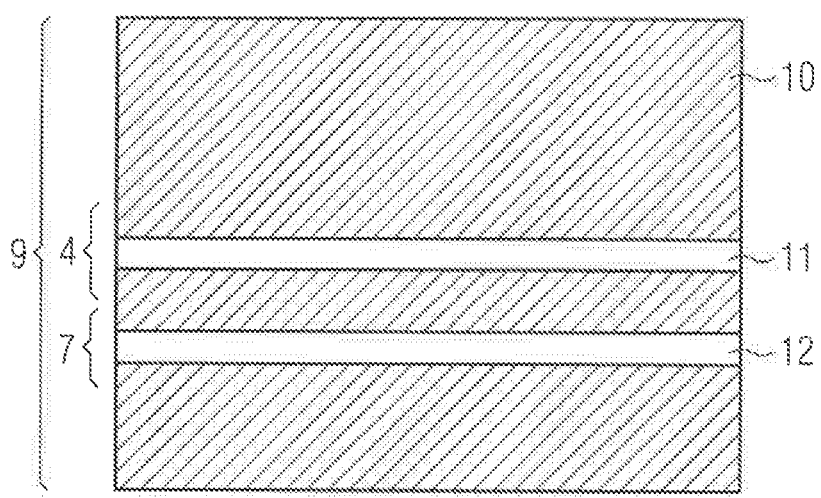
FIG. 2 shows a schematic illustration of an image that is captured by a camera.

FIG. 2 shows an image 10, as it is captured by the camera 2. In a region 9 of the printed product, an image 10 is recorded by the camera 2. One portion of the image 10 originates from the partial region 4, which is illuminated by the first illumination unit 3. A second portion of the image 10 originates from the partial region 7, which is illuminated by the second illumination unit 6. A first stripe 11 is evaluated from the portion of the image that originates from the first partial region 4. Accordingly, a second stripe 12 is evaluated from the portion of the image that originates from the second partial region 7.

In a particularly expedient implementation, a camera 2 is used, in which it is already configurable that only specific partial regions, in the present case the lines of an image sensor that correspond to the stripes 11 and 12, are evaluated and passed on to the evaluation unit 5. Consequently, the amount of the data to be transferred and processed is reduced. However, it is just as possible to use a simpler camera 2, which transmits the entire image 10 to the evaluation unit 5, whereupon the evaluation unit 5 must extract the stripes 11 and 12 from the image 10.

Several possibilities as to how the image data can be processed to ascertain errors in the printed image exist for the evaluation unit 5. In a preferred implementation, first stripes 11, which are recorded in succession, are joined to form a total image such that a total image is visible to an observer or an image analysis algorithm, as if a larger region of the printed product 17 had been recorded at the same time. The same applies to the second stripe 12. It is also possible to join a multiplicity thereof to form a total image. In the above-described example of detecting holes in the printed product 17, a large dark area in which possibly individual bright points are present would result if the printed product contained a hole and the light from the second illumination unit 6 shone through. A practical use herefor are yoghurt lids, in which it is not only important for the print on the top side to be correct, but which also must not contain any holes.

Figure 3:
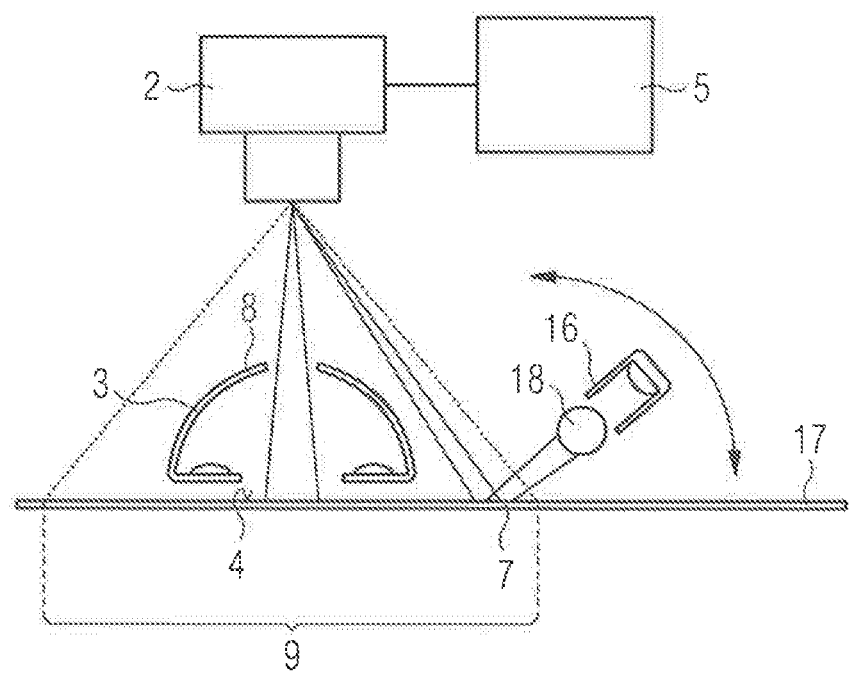
FIG. 3 shows a second exemplary embodiment of an apparatus for inspecting printed images.

FIG. 3 shows a second exemplary embodiment of an apparatus for inspecting printed images according to embodiments of the invention. The second illumination unit shown here is an incident-light illumination unit 16. In the latter, light from a light source is focused by a lens and emitted in the form of directional light onto the surface of the printed product 17. The light incidence angle is adjustable in this case. By way of such a type of illumination, it is possible, for example, to make the edges of transparent labels visible, such that the positioning of the labels on a carrier can be checked.

A second example of use are adhesive locations of shrink labels on transparent plastic bottles. Whether such adhesive locations are implemented correctly can be ascertained with incident light that is incident at a flat angle, because light is scattered at the adhesive locations and can thus fall into the camera, while reflected light is reflected at an angle corresponding to the light incidence angle, at which it cannot fall into the camera.

Figure 4:
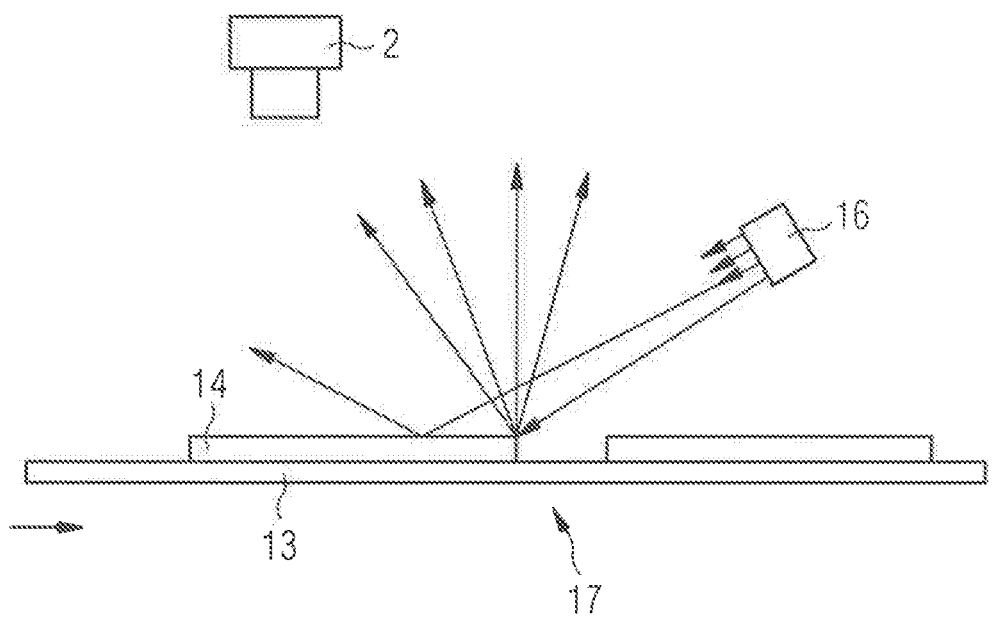
FIG. 4 shows an illustration of the function of edge detection with incident illumination.

The use of incident light will be explained in more detail with reference to FIG. 4. Here, light from the directional incident-light source 16 is incident at a flat angle on a printed product 17, which consists of a carrier 13 with labels 14 which are attached thereto. The labels 14 are transparent, with the result that the edges of the labels 14 cannot be detected by way of their color. When the light that is incident at an angle strikes the surface of the labels or of the carrier, it is reflected in accordance with the principle that angle of incidence equals angle of reflection and cannot enter the camera 2. However, light that strikes the edges of the labels 14 is scattered here, with the result that it can be captured by the camera 2.

The background illumination unit, and the incident light, are preferably implemented in the form of line light, the light exit of which, if necessary, is focused via a cylindrical lens such that the second partial region 7 is uniformly lit.

A further concrete example of use is the simultaneous inspection of a printed image and, for example, of a lacquer or adhesive application. Elevated contours or edges can also be made visible by the laterally acting illumination.

An apparatus for inspecting printed images according to embodiments of the invention can have further illumination units, which produce different types of illumination. For example, tunnel illumination can be combined with incident light and a background illumination unit, wherein in each case different illumination units are activated, depending on the printed product that is to be checked at that time.

The partial regions 4 and 7, which are illuminated by the illumination units, are arranged next to one another in the exemplary embodiments shown in FIGS. 1 and 3. However, the background illumination unit could also be used underneath the tunnel, such that the first and second stripes 11 and 12 are both situated within the tunnel. The second partial region 7 and the first partial region 4 would consequently both be arranged within the tunnel, wherein the second partial region 7 would be illuminated both from above, by way of the diffuse illumination, and from the rear. The first and second partial regions consequently overlap.

A particular feature of an embodiment an apparatus for inspecting printed images is that the at least two illumination units 3 and 6 or 16 can be operated cyclically and with time synchronization. Since both partial regions 4 and 7 are recorded at the same time, it is very important that they are also illuminated at the same time. If a cyclic type of operation is selected, the illumination by the at least two illumination units must be at least precisely matched to one another such that there is an overlap region of the illumination periods in which an image in which both partial regions are illuminated can be recorded.

The invention is not limited to the exemplary embodiments described herein. Further applications can be found in particular by way of the use of UV light sources.

The invention claimed is:

1. An apparatus comprising:
    a camera configured to record a surface of a printed image, the printed image being movable relative to the apparatus;
    a first illumination unit of a first type configured to illuminate a first partial region of a region of the printed image capturable by the camera;
    a second illumination unit of a second type configured to illuminate a second partial region of the region capturable by the camera, wherein the first and second partial regions are arranged laterally next to each other; and
    an evaluation unit configured to process image information captured by the camera,
    wherein the first illumination unit differs from the second illumination unit,
    wherein the first illumination unit forms a diffuse illumination source and has an internally illuminated tunnel, and
    wherein the apparatus is configured to inspect printed images.

2. The apparatus as claimed in claim 1, wherein the second illumination unit is configured to illuminate the printed image on a side that faces away from the camera.

3. The apparatus as claimed in claim 1, wherein the second illumination unit is arranged outside the tunnel for illuminating a partial region of the region capturable by the camera outside the tunnel.

4. The apparatus as claimed in claim 1, wherein the apparatus is configured such that the two illumination units illuminate cyclically and with time synchronization.

5. The apparatus as claimed in claim 1, wherein the camera is configured to perform a surface inspection of the first and second partial regions at the same time.

6. The apparatus as claimed in claim 1, wherein the evaluation unit is configured to evaluate at least two stripes of an image that is captured by the camera, and wherein a first stripe originates from the first partial region and a second stripe originates from the second partial region.

7. The apparatus as claimed in claim 6, wherein the evaluation unit is configured to join together a plurality of successively recorded first stripes to form an overall image.

8. The apparatus as claimed in claim 7, wherein the evaluation unit is configured to join together a plurality of successively recorded second stripes to form the overall image.

9. The apparatus as claimed in claim 1, wherein the second illumination unit forms a directional light source.

10. The apparatus as claimed in claim 9, wherein the second illumination unit is configured to form incident light with an adjustable light incidence angle.

11. The apparatus as claimed in claim 9, wherein the second illumination unit is configured to produce stripe-shaped light.

12. The apparatus as claimed in claim 11, wherein the second illumination unit has a cylindrical lens.

13. An apparatus comprising:
    a camera configured to record a surface of a printed image, the printed image being movable relative to the apparatus;
    a first illumination unit of a first type configured to illuminate a first partial region of a region of the printed image capturable by the camera;
    a second illumination unit of a second type configured to illuminate a second partial region of the region capturable by the camera,
    wherein the camera is configured to perform a surface inspection of the first and second partial regions at the same time; and
    an evaluation unit configured to process image information captured by the camera,
    wherein the first illumination unit differs from the second illumination unit,
    wherein the first illumination unit forms a diffuse illumination source and has an internally illuminated tunnel, and
    wherein the apparatus is configured to inspect printed images.

14. The apparatus as claimed in claim 13, wherein the second illumination unit is configured to illuminate the printed image on a side that faces away from the camera.

15. The apparatus as claimed in claim 13, wherein the second illumination unit is arranged outside the tunnel for illuminating a partial region of the region capturable by the camera outside the tunnel.

16. The apparatus as claimed in claim 13, wherein the second illumination unit forms a directional light source.

17. The apparatus as claimed in claim 16, wherein the second illumination unit is configured to produce stripe-shaped light.

18. The apparatus as claimed in claim 13, wherein the evaluation unit is configured to evaluate at least two stripes of an image that is captured by the camera, and wherein a first stripe originates from the first partial region and a second stripe originates from the second partial region.

19. The apparatus as claimed in claim 18, wherein the evaluation unit is configured to join together a plurality of successively recorded first stripes to form an overall image.

20. An apparatus comprising:
    a camera configured to record a surface of a printed image, the printed image being movable relative to the apparatus;
    a first illumination unit of a first type configured to illuminate a first partial region of a region of the printed image capturable by the camera;
    a second illumination unit of a second type configured to illuminate a second partial region of the region capturable by the camera,
    wherein the first and second illumination units are located on the same side of the printed image as the camera; and
    an evaluation unit configured to process image information captured by the camera,
    wherein the first illumination unit differs from the second illumination unit,
    wherein the first illumination unit forms a diffuse illumination source and has an internally illuminated tunnel, and
    wherein the apparatus is configured to inspect printed images.

* * * * *